March 30, 1937.  O. SLETTEVOLD  2,075,630
MULTIPLE CHECK SIGNER
Filed March 7, 1932  5 Sheets—Sheet 2
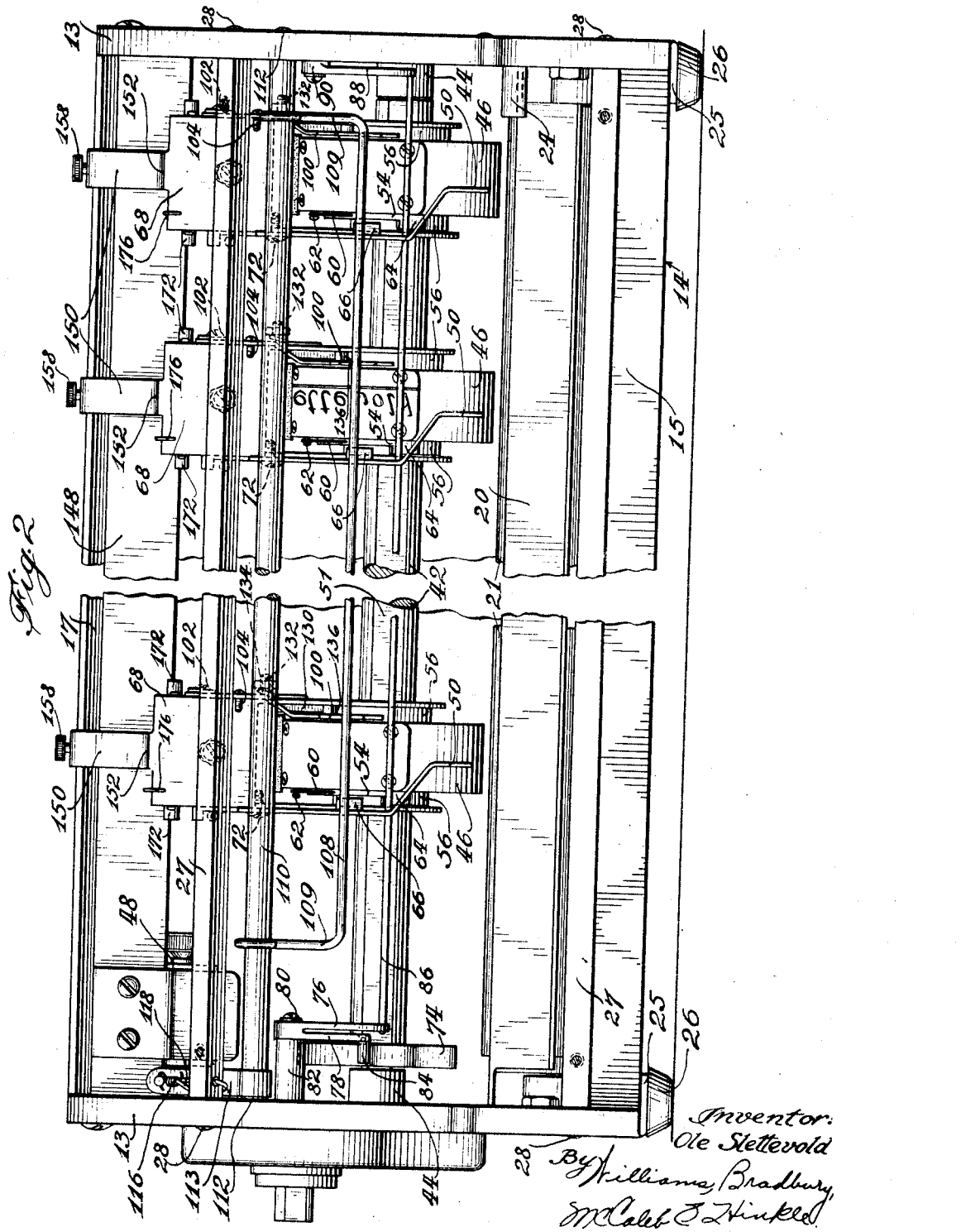
Inventor:
Ole Slettevold
By Williams, Bradbury,
McCaleb & Hinkle
Attys.

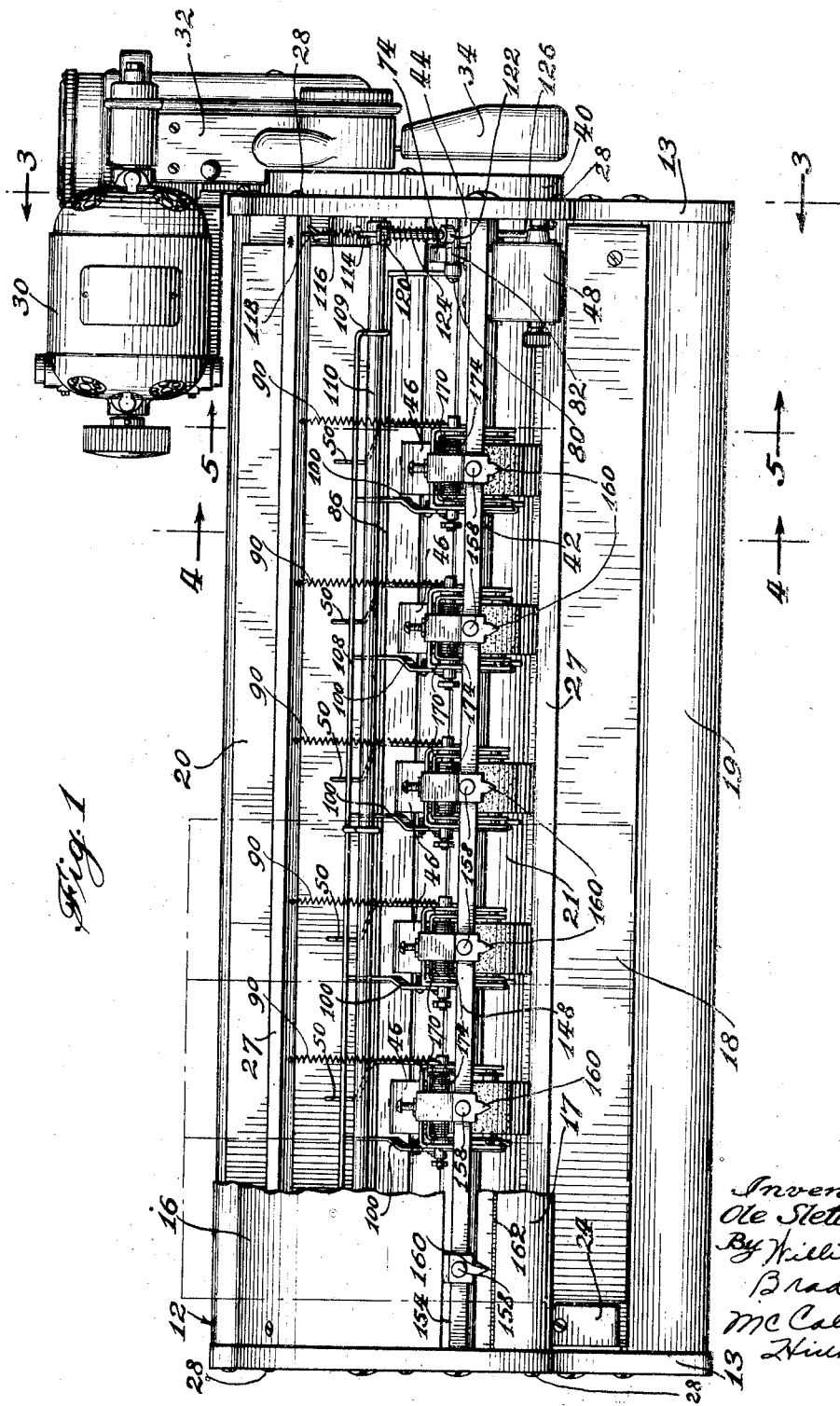

March 30, 1937. O. SLETTEVOLD 2,075,630
MULTIPLE CHECK SIGNER
Filed March 7, 1932 5 Sheets-Sheet 3
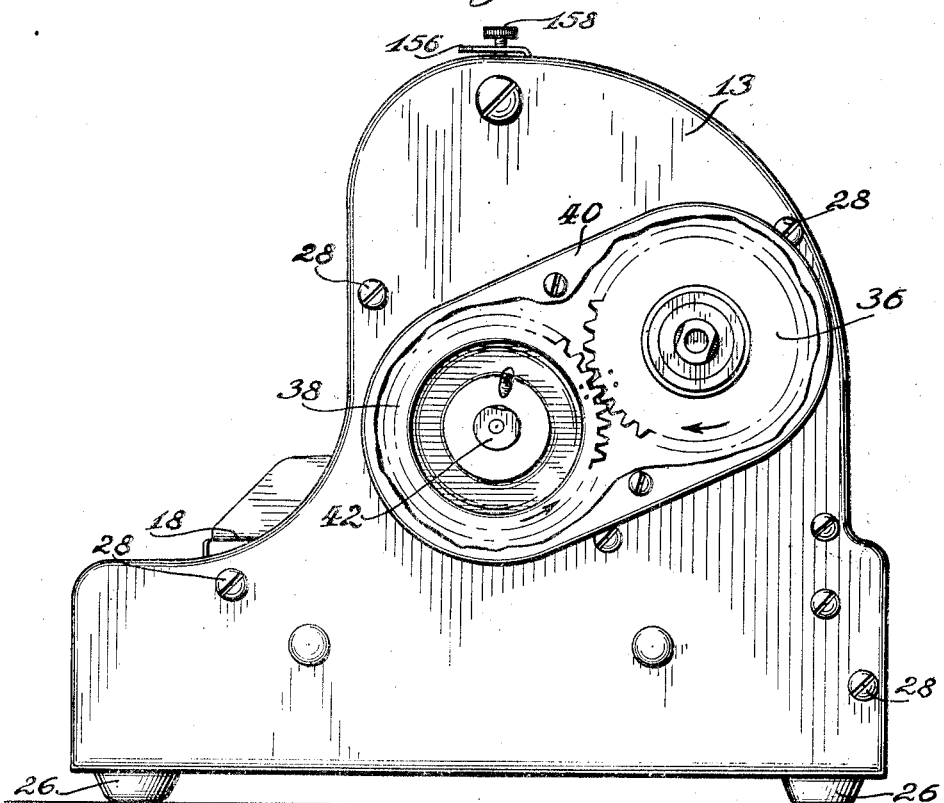
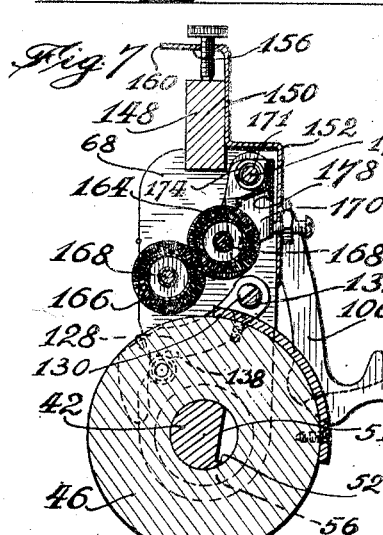
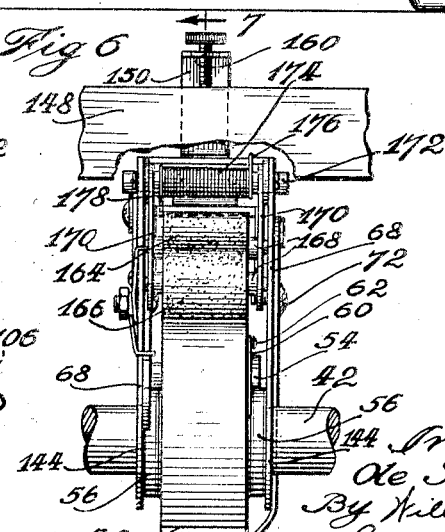
Inventor
Ole Slettevold
By Williams,
Bradbury,
McCabe & Hinkle
attys March 30, 1937. O. SLETTEVOLD 2,075,630
MULTIPLE CHECK SIGNER
Filed March 7, 1932 5 Sheets-Sheet 4
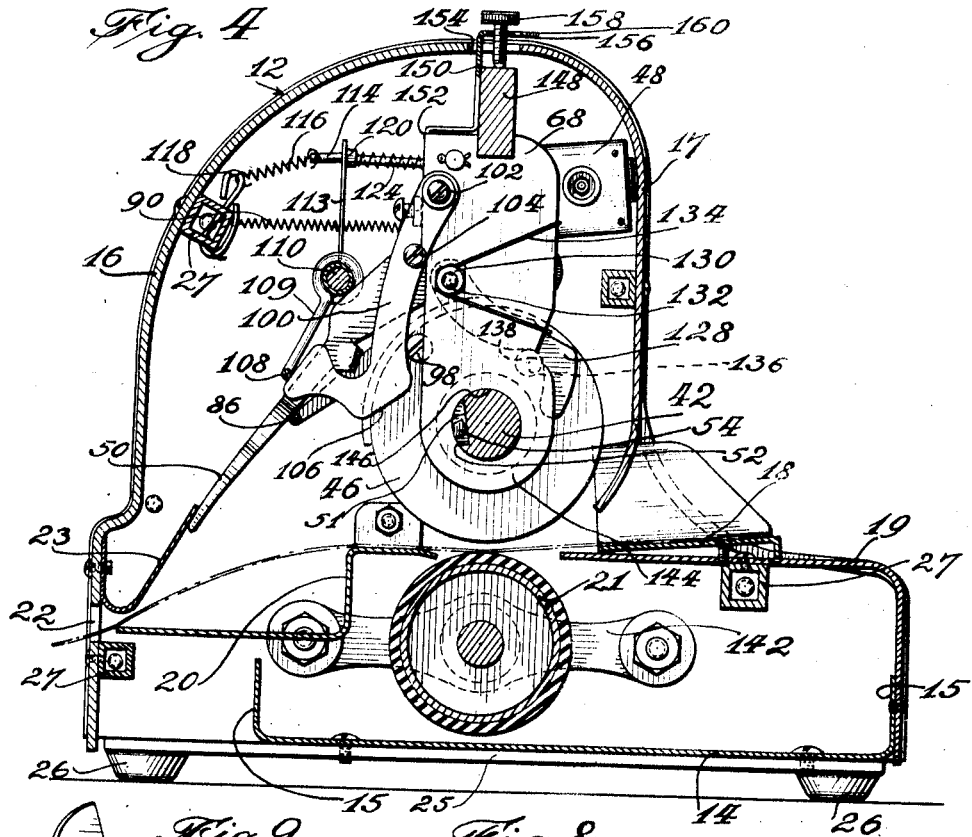
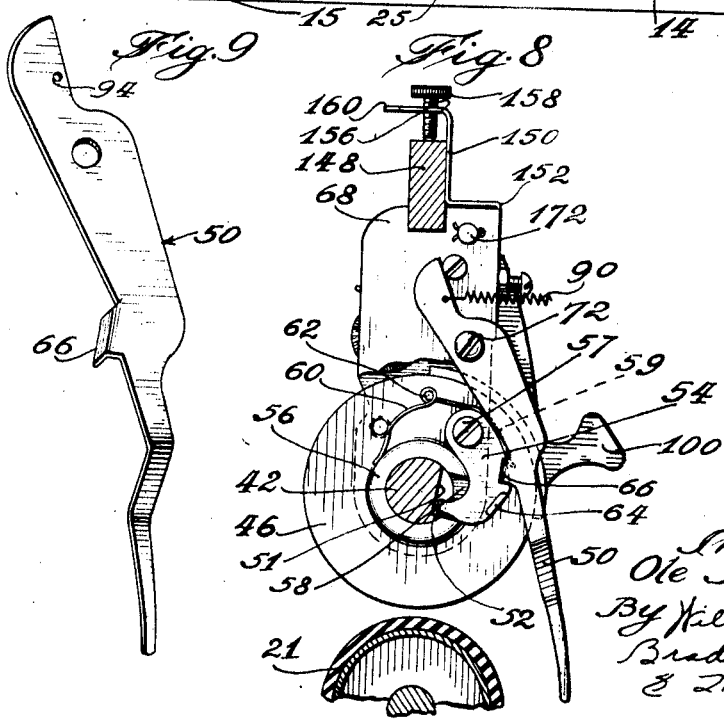
Inventor:
Ole Slettevold
By Williams,
Bradbury, McCaleb
& Hinkle
Attys March 30, 1937.  O. SLETTEVOLD  2,075,630
MULTIPLE CHECK SIGNER
Filed March 7, 1932   5 Sheets—Sheet 5
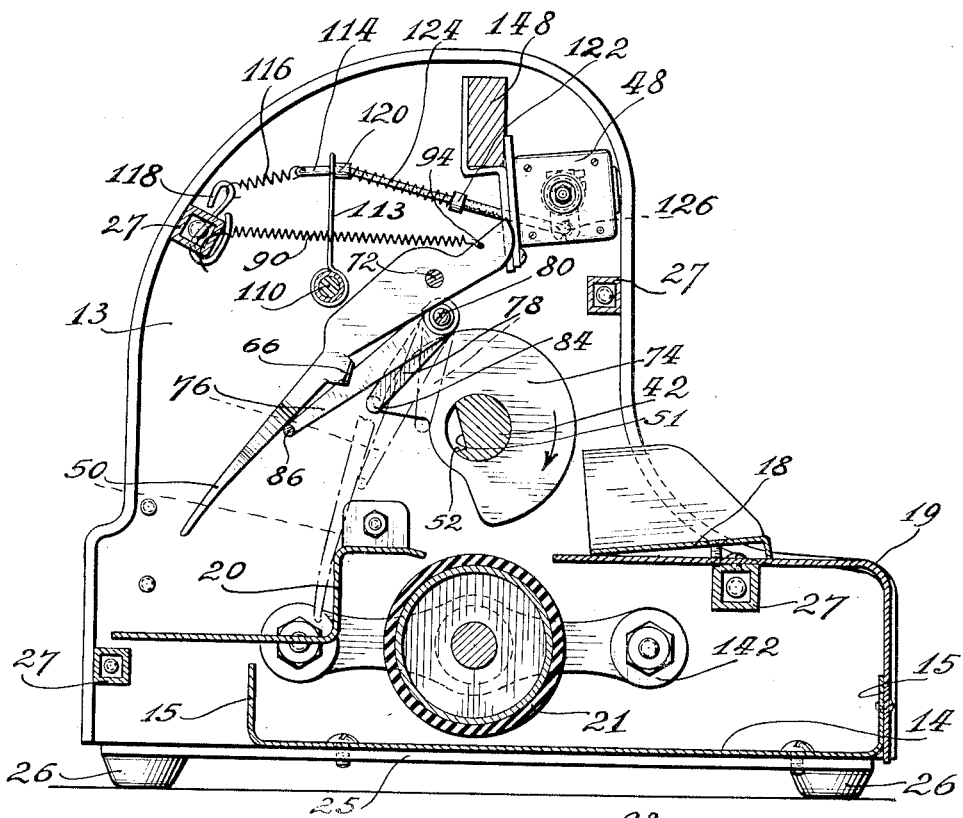
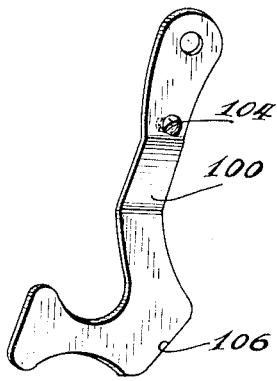
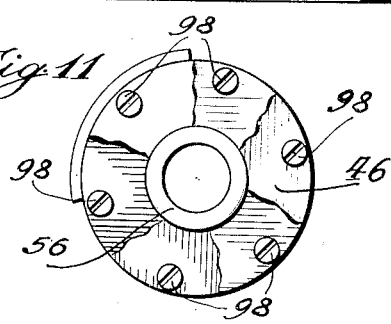
Inventor
Ole Slettevold
By Williams, Bradbury,
McCaleb & Hinkle
Attys.

Patented Mar. 30, 1937

2,075,630

UNITED STATES PATENT OFFICE 2,075,630

MULTIPLE CHECK SIGNER

Ole Slettevold, Chicago, Ill., assignor to The Hedman Manufacturing Company, Chicago, Ill., a corporation of Illinois Application March 7, 1932, Serial No. 597,289

15 Claims. (Cl. 235—91)

My invention relates to check signing machines and more particularly to that type of machine adapted to imprint a signature on a plurality of checks simultaneously.

Difficulty has been encountered in the multiple check signing machines of the prior art in that the registering mechanism employed registers each operation of the machine but does not register the signing of each individual check. For example, if a multiple check signer were provided with means for imprinting a signature on five checks at one time, it would be necessary to feed five checks through the machine for signing at each operation in order that the registering mechanism would register the correct number of checks signed. The registering indicator would either be arranged to register in multiples of five or it would be necessary to multiply the number registered on the indicator by 5 in order to calculate the correct number of checks signed. For this reason it is necessary that the machine always be operated at its total capacity at each operation. On the prior device there was no provision whereby one or two checks could be signed by the machine and the number signed correctly registered.

In the present invention I provide means for imprinting a signature on a plurality of checks simultaneously and provide means for registering the signing of each check individually.

A further difficulty encountered in the use of the machines of the prior art is that the machines are adapted to accommodate checks of only a certain width. Usually the checks are attached together in strips with the upper edge of one check still fastened on the lower edge of the adjoining check so that if five checks are fed through the machine at one time for signing it is necessary that the distances between adjacent signature imprinting means correspond to the width of the checks to be signed. My invention contemplates the provision of means whereby the distance between individual check signers may be adjusted to accommodate any width of checks.

An object of my invention is the provision of an improved and simplified check signing machine adapted to sign a plurality of checks simultaneously.

Another object of my invention is the provision of an improved check signing machine adapted to sign a plurality of checks simultaneously and register the signing of each check individually.

My invention further contemplates the provision of means for signing a plurality of checks and means for adjusting the position of the check signing mechanism whereby checks of any width may be fed into the machine for signing.

My invention further contemplates the provision of means for signing any number of checks from one up to the limits of the capacity of the machine, and means for registering the signing of each check individually.

My invention further contemplates the provision of means whereby a plurality of checks of any width may be taken from the check book without detaching one from the other, fed into the machine in this attached relationship, signed with the signature desired, and the signing of each check registered.

Other objects and advantages will be apparent from an understanding of the specification taken in conjunction with the drawings, in which:

Figure 1 is a plan view of the multiple check signer with the top of the housing partly broken away;

Figure 2 is a rear view thereof with part of the housing removed;

Figure 3 is a view taken on the line 3—3 of Figure 1 in the direction indicated by the arrows;

Figure 4 is a view taken on the line 4—4 of Figure 1 in the direction indicated by the arrows;

Figure 5 is a view taken on the line 5—5 of Figure 1 in the direction indicated by the arrows;

Figure 6 is a front view of one of my improved check signing mechanisms;

Figure 7 is a view taken on the line 7—7 of Figure 6 in the direction indicated by the arrows;

Figure 8 is an end view of an individual check signing mechanism with a portion of the mounting frame removed;

Figure 9 is a perspective view of a check operated release lever;

Figure 10 is a view of a bail operating lever; and

Figure 11 is a view with portions of each of the cylindrical members broken away to show the relative position of the bail operating projections.

The multiple check signer illustrated in the drawings in general comprises a casing or housing 12, made up of side members or side plates 13, a bottom plate 14 having upturned edges as at 15 and top cover plates 16 and 17. A check feeding platform 18 extending entirely across the housing may be provided and may be secured in any suitable manner to a front plate or apron 19 secured to the front upturned edge 15 of the bottom plate 14.

A check receiving platform 20 extends across the housing at the rear thereof and may be secured to the side plates 13 in any suitable manner. Checks are fed into the machine on the check feeding platform 18 over a roller 21, on to the check receiving platform 20, and out of the machine through an elongated slot 22 extending the full length of the machine. An upwardly curved member 23 secured to the rear cover plate 16 serves to guide the checks into the elongated slot 22 and a guide strip 24 at the extreme left of the housing serves to show the position at which the check sheet should be placed.

The side plates 13 may be bent over as at 25 to provide a flange for the attachment of supporting feet 26 and also to provide a flange for securing the bottom cover plate 14. A plurality of rods or bars 27 extending between the side plates 13 serve to re-enforce the housing assembly and are attached to the side plates 13 by means of screws 28 which pass through apertures provided in the side plates.

The mechanism for driving my improved multiple check signer may be of any suitable type and may comprise a motor 30 provided with suitable clutch mechanism 32, and a control switch operating lever 34. The driving mechanism for the multiple check may be similar to the type shown in my copending application Serial No. 474,143, filed August 9, 1930, but as it forms no part of my present invention, per se, it will be sufficient to say the motor 30 and its associated clutch and switch mechanism are controlled by the lever 34 and a single depression of the lever 34 causes the motor to rotate a gear 36, which is mounted on a stub shaft supported from the driving mechanism, through one complete revolution. Upon one complete revolution of the gear 36, the motor 30 is automatically stopped so that a gear 38 in mesh with the gear 36 is also driven through one complete revolution. The two gears 36 and 38 are mounted together at one end of the housing 12, and are enclosed by a suitable cover plate 40 which may be attached to the side plate 13 in any suitable manner. The gear 38 is mounted on main shaft 42 which extends through an aperture in the right cover plate 13 entirely across the housing 12 and is journaled in bearing support members 44 affixed in any suitable manner to the inside of the side plates 13.

On the main shaft 42 there may be mounted any number of rotatable type cylinder carriers 46, the number of which will depend upon the maximum number of checks which it is contemplated will be fed through the machine at any one time. The cylindrical members 46 are adapted to carry means for impressing a signature on a check, and accordingly a signature carrying plate, formed in the usual manner well known in the art to which this invention appertains, is affixed to the periphery of each of the cylindrical members 46. The rotatable cylinders 46, upon which the signature impressing means are mounted, should preferably be adapted to be selectively rotated with the shaft 42 and the rotation of each of the members 46 should preferably be registered individually on a registering mechanism 48 provided within the housing 12. The housing 12 is provided with a slot-shaped aperture through which the indicia on the register may be observed.

In order to adapt my multiple check signer to sign and register the signing of the exact number of checks fed through the machine, I provide means whereby the cylindrical members 46 may be selectively rotated depending upon the number of check blanks on the sheet which is inserted in the machine. Accordingly the cylindrical members 46 are mounted loosely on the shaft 42 and means are provided whereby the members 46 may be rotated with the shaft when a check is inserted below the cylindrical member 46 and pushed until it comes in contact with a lever 50. The shaft 42 is longitudinally slotted throughout its length as at 51, and the slot may be cut in any suitable manner so as to provide a ledge 52 which is adapted to be engaged by a plurality of pawls 54, each associated with one of the cylindrical members 46.

Each of the cylindrical members 46 is provided with a hub 56. A slot or aperture 58 is cut in each of the hubs 56 through which the pawl 54 projects to engage the ledge 52. The pawl 54 which is pivoted to the cylindrical member 46 at 57 is normally held in engagement with the outer periphery of the hub 56 by means of a wire spring 60, one end of which engages an indenture 59 provided in the edge of the pawl 54 and is secured to the cylinder member 46 as at 62, while the other end is in engagement with the hub 56. By means of this spring pressure the pawl 54 is normally held in the aperture 58 formed in the hub of the cylindrical member and in position to be engaged by the ledge 52.

The pawl 54 is provided with a sidewardly projecting lug 64 which is adapted to engage a cooperating projection 66 formed on the lever 50. The lever 50 depends from a signature mechanism supporting framework 68 in such manner that the lug 66 engages the lug 64 formed on the pawl 54 when a check has not been inserted beneath the cylindrical member 46.

Checks are inserted in the machine from the right (Fig. 4) on the inclined check feeding platform 18 and are pushed beneath the cylindrical members 46 until the ends of the checks engage the levers 50 and swing them to the left. When the levers 50 have been pushed to the left the pawls 54 are free to remain in engagement with ledge 52 so that the cylindrical members are rotated with the shaft. If a check is not inserted beneath a particular cylindrical member 46, the lever 50 is not pushed to the left and instead the projection 66 thereof engages the projection 64 on the pawl 54 and forces the pawl out of engagement with the ledge 52 against the tension of the spring 60.

If desired the lever 50 may normally depend in a position shown in Figure 8, in which position the projection 66 is always in position to be engaged by the projection 64, but it is preferable that the lever 50 be normally held in the position shown in Figure 4. For this purpose the lever 50 is pivoted to the supporting frame 68 as at 72 and a cam 74 is mounted on the shaft 42, as shown in Figures 2 and 5. A bell crank, having arms 76 and 78, is pivoted at 80, to a lug 82 extending from one of the side plates 13, the lug being affixed thereto in any suitable manner. The arm 78 of the bell crank carries a stud upon which is mounted a roller or cam follower 84. To the other arm 76 of the bell crank, there is affixed in any suitable manner a rod 86 which extends entirely across the housing 12. The rod 86 is affixed at the other end to an arm 88 pivoted as at 89 to the left side plate 13 (at the right in Fig. 2).

Normally the cam follower 84 rests on the high portion of the cam 74, and the rod 86 normally retains the levers 50 in the position shown in Figure 5 in solid lines. Each of the levers 50 may be provided with a light spring 90 which normally urges the levers into the position shown in dotted lines, one end of each of the springs being attached to the levers, as at 94, and the other ends affixed in any suitable manner to one of the cross bars 27. Thus when the shaft 42, together with the cam 74, is rotated in a clockwise direction, (Fig. 5), the cam follower 84 drops into the cam depression and assumes the position shown in dotted lines in Fig. 5. The arm 76 moves counter-clockwise carrying with it the rod 86, allowing the tension springs 90 to move the levers 50 into the position shown in dotted lines. In this manner the levers 50 are normally held to the extreme left but as soon as the shaft 42 is rotated they are brought into position to be engaged by checks which have been inserted in the machine.

Each of the cylindrical members 46 is provided with a projection or, as shown in the drawings, a screw 98 which is inserted in one face of each of the cylindrical members 46 and projects slightly so that it is adapted to engage a bail push arm 100. The bail push arm 100 may be pivoted to the supporting framework 68 at 102 and depend in the path of rotation of the projection 98. The movement of the bail push arm 100 may be limited by means of a stud or screw 104 which passes through the arm 100 and contacts with the supporting framework 68 when the projection 98 is not in engagement with the arm 100. When the cylindrical members 46 are rotated each of the projections 98 engage a cam portion 106 provided on the bail push arm 100 and the arm is moved to the left to engage a bail rod 108. The bail rod 108 extends across the housing 12, as shown in Figure 2, and is supported from a rod 110 to which it is affixed by arms 109. The rod 110 also extends across the housing and is pivoted at both ends to the side plates 13 as at 112.

A movement of the rod 110 in a clockwise direction moves an arm 113, which is attached to the shaft 110, to the right, as shown in Figure 4, and each movement of the arm 113 to the right actuates the register 48. This may be accomplished in any suitable manner but as shown in the drawings, a rod 114 extends through an aperture formed in the arm 113 and is provided with an aperture into which an end of a spring 116 is inserted. The other end of the spring 116 may be secured to a hook 118 and the hook may be secured to one of the cross rods 27. The rod 114 is provided with a movable collar 120 which is adapted to be engaged by the arm 113 and with a fixed collar 122 between which there is mounted a spring 124. The end of the rod 114 is affixed to a crank 126 which is arranged to operate the register 48. When the arm and the rod 114 are moved to the right against the tension of the spring 124, the crank 126 is oscillated so that movement of the bail arm 100 actuates the register 48. The spring 124 serves to cushion the force of the movement of the arm 113 and the arm is returned to its normal position by the spring 116.

When a number of checks are fed through the machine simultaneously it is necessary that the bail push arms 100 be operated successively so that the signing of each check will be registered individually. Accordingly means are provided for operating the bail arms successively by having the projections 98 angularly displaced relative to one another on the cylindrical members 46. As illustrated in Figure 11, the machine shown having six type carriers, the relative spacing of the projections 98 between adjoining cylindrical members is one-sixth of the circumference.

In order to synchronize the rotations of the cylindrical members 46 so that upon feeding checks into the machine each of the cylindrical members will start from the same position, a pawl 128 is pivoted to each of the supporting frames 68 at 130 by means of a bolt 132 which extends through one of the sides of the supporting framework 68.

A spring 134 is wrapped around the extended end of the bolt and one end is bent over and caught behind the supporting framework 68 and the other engages the pawl 128 and urges it downwardly as shown in Figure 4. Each of the cylindrical members 46 is provided with a projecting lug 136 and each of the pawls 128 is curved as at 138.

When the shaft 42 is rotated the pawl 54 engages the ledge 52 in the shaft, rotating the cylindrical member 46 for a slight distance. If the lever 50 has not been pushed aside by a check the lug 64 is engaged by the lug 66 and the pawl 54 is withdrawn from engagement with the ledge.

It will be observed that, even though the lever 50 has not been pushed to the left by insertion of a check, the cylindrical members will be rotated slightly and some means of returning the cylindrical members 46 to normal position is therefore provided. This is accomplished by means of the lug 136 and the pawl 128, as a rotation of the cylindrical member 46 in a clockwise direction from that shown in Figure 4 will bring the toe of the pawl in engagement with the lug 136, and when the pawl 54 is released from engagement with the ledge 52 the spring 134 will cause the cylindrical member 46 to snap back into its normal position as shown in Figure 4.

The roller 21 extends between the side plates 13 and is supported by a pair of members 142 which may be riveted or otherwise attached to the side plates 13. Suitable bearings may be provided in the members 142 for the roller 21. The roller may be of any suitable material but is preferably provided with a rubber or serrated metallic surface. In mounting the roller 21 it is necessary that the signature impressing means contact with the roller 21 when the members 46 are rotated so that a clear impression of the signature may be made on the checks as they are fed between cylindrical members 46 and the roller 21.

Each of the supporting frames 68 is provided with depending side plates 144 which partially enclose the cylindrical member 46 and each of the depending side plates has an aperture 146 through which the shaft 42 passes. In order to accommodate checks of various widths the supporting frames are guided by a bar 148 extending between the side plates. Angular pieces 150 are riveted or otherwise attached to the frames 68 as at 152. The supporting pieces are bent as at 156 and project through a longitudinal slot 154 provided in the cover plate 17.

In this manner the supporting frames 68, together with the entire assembly associated with the cylindrical members 46, and the cylindrical members, which are freely slidable along the shaft 42, may be moved along the guiding bar 148, and may then be secured in any desired position by means of a set screw 158. The bent over portion 156 of the members 150 may terminate in a pointer 160 so that the distance between pointers will indicate the distance between the centers of the cylindrical members and this distance may be read on an indicating scale 162 marked upon the top cover plate of the housing.

Between the side plates of the supporting frame 68 there is mounted a pair of inking rollers 164 and 166, which are rotatable on shafts 168. Both of the shafts 168 are journaled in a pivoted U shaped frame 170. The upwardly extending end of the forked member 170 is provided with apertures 171 through which a shaft 172 extends. The shaft 172 also extends through apertures provided in the supporting frame 68 and cotter keys or other suitable means are provided for retaining the shaft in the supporting frame.

In order to ink the signature impressing means properly upon each rotation of cylindrical members 46, means are provided for normally urging the inking rollers into contact with the signature dies upon the cylindrical members 46. This is accomplished by a spring 174 which encompasses the shaft 172, one end 176 of which is hooked over the upper edge of the supporting frame and the other end 178 of which presses against the support 170 of the inking rollers and tends normally to urge the inking rollers downwardly into contact with the signature die secured to the cylindrical member 46.

In operation, the distance between the cylindrical members 46 is adjusted to correspond to the width of the checks to be signed by moving the indicators along the bar 148 to the proper positions. Checks are then fed into the machine on to the check feeding platform 18 beneath the cylindrical members 46 until the right transverse edge of the check is even with the edge of the check feeding platform 18 as shown in dotted lines in Fig. 4. If the number of checks corresponds to the number of cylindrical members, all the members 46 are rotated, if less than this number of checks is fed into the machine one or more of the cylindrical members remains inoperative, as previously described.

The lever 34 is pressed and the shaft 42 is rotated through one complete revolution and then stopped. As the shaft begins to rotate the pawls 54 engage the ledge 52 and all the cylindrical members are rotated. Rotation of the shaft 42 rotates the cam 74 until the cam follower 84 drops into the depression in the cam so as to move the rod 86 counterclockwise, allowing the pressure of the springs 90 to push the levers 50 down against the checks. If no check has been inserted beneath a particular one of the cylindrical members the particular lever associated with the cylindrical member is pushed by the spring pressure to its lowermost position (Fig. 8) where the projection 66 is in position to engage the lug 64 of the pawl 54 and remove the pawl from engagement with the ledge 52. However, if a check has been inserted beneath the cylindrical member 46 when the lever 50 moves downwardly it comes in contact with the check and is held out of its lowermost position so that the projection 66 will not be in the path of the lug 64 of the pawl 54 as the pawl is rotated. The cylindrical member is thus rotated and when the signature impressing means comes in contact with the check the signature is imprinted on the check. Due to the fact that the distance between the center of the roller 21 and the center of the cylindrical member 46 is made such that the signature impressing means contacts with the roller 21 during rotation, the check is pushed to the rear of the machine and guided out of the slot 22 by the member 23. The signing of each check is individually registered as previously described.

The signature impressing means may be formed in any manner and the letters of the name are preferably serrated or otherwise formed to prevent alteration of the signature and to make it distinctive. It is preferable in a machine of this type that means be provided for preventing tampering with the mechanism or the register and accordingly the casing 12 may be provided with a key operated lock so that the register which is entirely enclosed within the casing can be reached only by removing the cover plates 16 and 17.

While I have illustrated the preferred embodiment of my invention it is obvious that various changes can be made in the structure without departing from the spirit of my invention and I desire to avail myself of the scope of the appended claims.

1. In a machine of the class described, a shaft having a ledge therein, a plurality of members freely rotatable on said shaft, means including an element cooperable with said ledge for rotating a selected number of said rotatable elements with said shaft, a projection on each of said rotatable members, arms depending in the path of each of said projections, and register means operated by said arms, said projections engaging successively with said arms as said rotatable elements are rotated, whereby rotation of each of said rotatable elements is registered.

2. In a multiple check signer, a plurality of rotatable elements, a shaft having a ledge therein, a plurality of pawls engageable with the ledge in said shaft, one of said pawls being mounted on each of said rotatable elements, means for rotating said shaft through one complete revolution, means for retracting a number of said pawls from engagement with said ledge, the number of pawls retracted being determined by the number of checks being signed, and means for returning all of said rotatable elements to a common starting position at the end of each rotation.

3. In a multiple check signer, a plurality of rotatable elements, a projection mounted on each of said elements, said projections being relatively angularly spaced from each other on adjacent elements, and solely mechanical means operated by said projections for registering the number of elements rotated.

4. In a check signing machine, a shaft having a ledge therein, a plurality of cylindrical printing members loosely mounted on said shaft, means for turning each of said members with said shaft, said means comprising a pawl engageable with the ledge of said shaft, and means controlled by checks for preventing engagement of said pawls with said ledge except when a check is in position to be imprinted by the printing member associated with the pawl.

5. In a machine of the class described, a plurality of elements having signature impressing means, means for simultaneously bringing into contact with checks to be imprinted such of said signature impressing means as have checks to be imprinted placed in printing position relative thereto, and a single register means controlled by said elements for registering individually the signing of each check.

6. In a machine of the class described, the combination of a shaft having a ledge therein, a plurality of members freely rotatable upon said shaft, signature impressing means on each of said members, means engageable with said ledge for rotating a number of said rotatable members determined by the number of checks in position to have signatures impressed thereon, and single means for registering rotation of each of said rotatable members, said last named means being operated by said members.

7. In a multiple check signer, the combination of a shaft having a ledge therein, a plurality of rotatable elements mounted upon said shaft, means for rotating said rotatable elements comprising a plurality of pawls engageable with said ledge, there being a pawl for each of said members, means for preventing said rotatable elements from being rotated by said shaft, said last named means comprising a plurality of levers adapted to be operated by such checks as are being printed and having parts thereon engaging said pawls to withdraw said pawls from engagement with said ledge.

8. In a machine of the class described, the combination of a plurality of rotatable elements having signature impressing means mounted thereon, motor means to rotate said elements through one complete revolution, a roller contacting with said signature impressing means when said elements are rotated, means for connecting said motor means to a number of said elements corresponding to the number of checks inserted between said elements and said roller, and means for sequentially registering the number of elements rotated.

9. In a check signing machine, a rotatable shaft, a plurality of members selectively rotatable by said shaft, the selection of said members for rotation by said shaft being effected by the insertion of checks to be printed, means on each of said rotatable members for imprinting indicia upon a check, and means for registering sequentially the number of checks printed, said last named means being operated by such of said members as are selected for operation by the checks.

10. In a machine of the class described, the combination of a shaft, means to rotate said shaft, a plurality of signature printing members mounted for rotation upon said shaft, means for coupling each of said members to said shaft, a roller, means for simultaneously guiding a plurality of checks through said machine between said printing members and said roller simultaneously to impress signatures upon a plurality of checks, check controlled means for selectively controlling the operation of said coupling means for coupling said printing members to said shaft, a single register having an operating element, and means on said members operable successively to actuate said element and thereby effect upon said register an indication of the total number of checks upon which signatures have been printed.

11. In a multiple check signing machine, the combination of a shaft, a plurality of rotatable printing members on said shaft, means associated with said shaft for rotating said members upon rotation of said shaft, means for selectively restraining one or more of said members from rotating with said shaft, means for returning said rotated members to a common starting position, and a single means actuated by such of said members as are rotated by said shaft for registering the number of members rotated.

12. In a multiple check signing machine, the combination of a plurality of rotatable elements each having signature impressing means thereon, means for adjusting the distances between adjacent signature impressing means, a rotatable shaft, individual clutch means to connect said elements to said shaft for rotating said rotatable elements, check controlled means for disengaging the clutches of such of said elements as are not supplied with checks to be signed, and means for bringing said rotatable elements to a common starting position at the end of each signature impressing operation of the machine.

13. In a machine of the class described, the combination of a plurality of rotatable elements each having a signature impressing means mounted thereon, a rotatable shaft supporting said elements, an operative driving connection between each of said elements and said shaft, and check operated means for controlling the operative driving connection of said shaft to such of said rotatable elements as are supplied with checks.

14. In a machine of the class described, a plurality of printing members, means for operating said members simultaneously to impress signatures upon a plurality of checks, a single register having an operating element, and means moved by each of said members effective sequentially to actuate said register operating element.

15. In a multiple check signing machine, the combination of a rotatable shaft, a plurality of printing members rotatable with respect to said shaft, means for coupling each of said members to said shaft, check controlled means for individually controlling said coupling means thereby selectively to couple said members to said shaft for rotation therewith, means for yieldingly holding said members in normal position, a single register, and means operated sequentially by such of said members which are coupled to said shaft to actuate said register.

OLE SLETTEVOLD.